United States Patent
Katsevich et al.

(10) Patent No.: US 11,087,508 B2
(45) Date of Patent: Aug. 10, 2021

(54) METHOD AND APPARATUS FOR ACCELERATION OF ITERATIVE RECONSTRUCTION OF A COMPUTED TOMOGRAPHY IMAGE

(71) Applicants: CANON MEDICAL SYSTEMS CORPORATION, Otawara (JP); THE UNIVERSITY OF CENTRAL FLORIDA RESEARCH FOUNDATION, Inc., Orlando, FL (US)

(72) Inventors: Alexander Katsevich, Oviedo, FL (US); Zhou Yu, Wilmette, IL (US); Daxin Shi, Buffalo Grove, IL (US)

(73) Assignees: CANON MEDICAL SYSTEMS CORPORATION, Otawara (JP); THE UNIVERSITY OF CENTRAL FLORIDA RESEARCH FOUNDATION, Inc., Orlando, FL (US)

( * ) Notice: Subject to any disclaimer, the term of this patent is extended or adjusted under 35 U.S.C. 154(b) by 0 days.

(21) Appl. No.: 16/206,922

(22) Filed: Nov. 30, 2018

(65) Prior Publication Data

US 2020/0175731 A1 Jun. 4, 2020

(51) Int. Cl.
*G06T 11/00* (2006.01)

(52) U.S. Cl.
CPC ....... *G06T 11/006* (2013.01); *G06T 2211/424* (2013.01)

(58) Field of Classification Search
CPC ... G06T 7/0012; G06T 11/003; G06T 11/006; G06T 2211/424; A61B 6/5205
See application file for complete search history.

(56) References Cited

U.S. PATENT DOCUMENTS

2008/0270465 A1* 10/2008 Vija et al. ............. G06T 11/006
2014/0140599 A1   5/2014 Kim et al. ............. G06T 7/0012

OTHER PUBLICATIONS

I.K. Hong, et al. "Ultrafast Preconditioned Conjugate Gradient OSEM Algorithm for Fully 3D PET Reconstruction" published in Nuclear Science Symposium Conference Record (NSS/MIC), 2010 IEEE, Oct. 30, 2010-Nov. 6, 2010, pp. 24.

(Continued)

*Primary Examiner* — Andrew W Johns
(74) *Attorney, Agent, or Firm* — Oblon, McClelland, Maier & Neustadt, L.L.P.

(57) ABSTRACT

A method and apparatus is provided to reconstruct a computed tomography image using iterative reconstruction (IR) that is accelerated using various combinations of ordered subsets, conjugate gradient, preconditioning, resetting/restarting, and/or gradient approximation techniques. For example, when restarting criteria are satisfied the IR algorithm can be reset by setting conjugate-gradient parameters to initial values and/or by changing the number of ordered subsets. The IR algorithm can be accelerated by approximately calculating the gradients, by using a diagonal or Fourier preconditioner, and by selectively updating the preconditioner based on the regularization function. The update direction and step size can be calculated using the preconditioner and a surrogate function, which is not necessarily separable.

26 Claims, 3 Drawing Sheets

(56) References Cited

OTHER PUBLICATIONS

J. A. Fessler, et al. "Conjugate-gradient preconditioning methods for shift-variant PET image reconstruction" IEEE Trans. Im. Proc., 8(5):688-99, May 1999.

Zhou Yu, et al. "Nested Loop Algorithm for Parallel Model Based Iterative Reconstruction," the proceedings of the 12th International Meeting on Fully Three-Dimensional Image Reconstruction in Radiology and Nuclear Medicine}, pp. 197-200, Lake Tahoe, California, Jun. 16-21, 2013.

Lin Fu, et al. "Space-variant channelized preconditioner design for 3D iterative CT reconstruction", Proc. Intl. Mtg. on Fully 3D Image Recon. in Rad. and Nuc. Med, pp. 205-208, 2013.

\* cited by examiner

METHOD AND APPARATUS FOR ACCELERATION OF ITERATIVE RECONSTRUCTION OF A COMPUTED TOMOGRAPHY IMAGE

FIELD

This disclosure relates to iterative reconstruction (IR) methods for reconstructing images in computed tomography (CT), and, more particularly, to improved convergence rates for IR methods by using a combination of conjugate-gradient and ordered-subsets techniques.

BACKGROUND

Computed tomography (CT) systems and methods are widely used, particularly for medical imaging and diagnosis. CT systems generally create images of one or more sectional slices through a subject's body. A radiation source, such as an X-ray source, irradiates the body from one side. At least one detector on the opposite side of the body receives radiation transmitted through the body. The attenuation of the radiation that has passed through the body is measured by processing electrical signals received from the detector.

A CT sinogram indicates attenuation through the body as a function of position along a detector array and as a function of the projection angle (i.e., view) from the X-ray source to an X-ray detector. In a sinogram, the spatial dimensions refer to the position along the array of X-ray detectors. The angle dimension refers to the projection angle between the X-ray source and detectors, defining of X-ray trajectories. The attenuation resulting from a portion of the imaged object will trace out a sine wave along the axis corresponding to the projection angle. Those portions farther from the axis of rotation correspond to sine waves with larger amplitudes, and the phase of the sine waves correspond to the angular positions around the rotation axis. Performing an inverse Radon transform—or any other image reconstruction method—reeconstructs an image from the projection data represented in the sinogram.

Statistical iterative reconstruction (IR) algorithms in tomography can provide improved image quality at reduced dose levels relative to more conventional reconstruction methods like filtered back-projection (FBP). However, in certain implementations, the statistical approach is slow, requiring substantial computation time. To remedy the slow computationally intensive operation of standard statistical reconstruction approaches, improved methods using iterative algorithms for statistical reconstruction that converge more quickly in fewer iterations are gaining recognition.

Accelerator methods can be variously combined with IR methods, including ordered subsets (OS), and Nesterov's acceleration techniques. OS methods beneficially reduce the computational cost by using only a subset of the measurement data per iteration of the image reconstruction algorithm. Nesterov's acceleration method can also be used to improve computational efficiency and performance of the IR method. Although these techniques can initially accelerate convergence, they can also have undesirable effects (e.g., limit cycles) that adversely affect convergence in the long run. Accordingly, better and faster converging algorithms are desired.

BRIEF DESCRIPTION OF THE DRAWINGS

A more complete understanding of this disclosure is provided by reference to the following detailed description when considered with the accompanying drawings, wherein.

DETAILED DESCRIPTION

Iterative reconstruction (IR) methods have gained considerable attention in X-ray CT imaging due to their superior image quality over conventional filtered backprojection (FBP) reconstruction methods. However, IR demands greater computational resources and time than FBP due to, e.g., the use of complicated system forward models and iterated processing procedures. IR algorithms with rapid convergence rates are thus highly beneficial in order to reduce iteration times without adversely affecting image quality.

Various iterative algorithms can be used to iteratively reconstruct CT images. These methods can include, e.g., gradient-based methods, iterative coordinate descent methods, and methods based on an optimization transfer. Additional methods can be based on an augmented Lagrange multiplier framework as well as the Bergman's splitting scheme.

Most of these algorithms still converge slowly due to the ill-posed nature of the tomographic reconstruction problem; thus acceleration techniques are advantageous in order to increase the convergence rate. In the gradient-based method, fast convergent algorithms can be used to achieve a Newton-type update, e.g., using the conjugate gradient (CG) method with some predefined preconditioners. Additionally, the ordered subsets (OS) method is another acceleration technique. One advantage of the OS acceleration is that it does not add extra algorithm complexity and hence can be readily combined with most existing algorithms. Also, in certain instances, Nesterov's momentum method can provide a quadratic convergence rate when applied with many of the existing iterative algorithms. A combination of two or more acceleration techniques, if done properly such as in the methods described herein, can result in further acceleration compared to either technique alone. For example, using the methods described herein, which variously combine CG methods with preconditioners, restarting methods, and OS-based methods, can achieve a considerable reconstruction speedup.

Iterative reconstruction (IR) has demonstrated improved image quality even at low dose level. One major challenge for wide application of IR is its high computational cost, and consequently long reconstruction time. There are two methods to improve the speed of IR. First, one can reduce the computation of each iteration using high performance computing hardware. Second, one can reduce the number of iteration required to reach the desired solution, that is, improve the convergence speed.

To reduce the computational cost of each iteration, massive parallel computing platforms such as GPU, multi-core CPUs have been used. To efficiently leverage the potential of parallelization, the algorithms are required to update the image simultaneously. Conventional simultaneous update algorithms tend to have slow convergence. The methods described herein provide an advanced algorithm that yields fast convergence speed of IR.

There are several related approaches to speeding up convergence of an IR algorithm. For example, accelerated Nesterov acceleration can be used in combination with a conjugate gradient (CG) technique and using ordered subsets (OS) to significantly improve the overall convergence speed. That is, the methods described herein use OS accelerated CG-based IR, which converges faster than the related OS-Nesterov methods.

OS-Nesterov methods can have a problem in that sometimes gradients are inexact, resulting in divergence of the solution. One potential challenge that can limit the speedup is that OS-type algorithms often suffer from a limit cycle problem. When an OS-type algorithm is combined with a momentum method, its convergence rate becomes more complicated.

Several ways to address the convergence problem include step-size restarting schemes, classical gradient-based algorithms, and other globally convergent methods. Step-size restarting schemes can be used to control the divergence issue when using Nesterov's acceleration, but they cannot avoid the limit cycle issue. OS-type algorithms can be entirely avoided by using classical gradient-based algorithms such as a preconditioned conjugate gradient method. However, designing effective preconditioners can prove challenging, especially for wide-cone-angle image reconstruction. Other globally convergent methods such as the incremental optimization transfer algorithm can also be applied.

In summary, IR can be applied to clinical CT to improve image quality even at low dose level. One major challenge for wider application of IR is the high computational cost that it typically entails, resulting in long reconstruction time. Two approaches to improving the speed of IR are hardware based and algorithm based. In the hardware-based approach, the computation of each iteration can be reduced using high performance computing hardware. In the algorithm-based approach, the number of iteration required to reach the desired solution can be reduced (i.e., the convergence speed is improved).

To reduce the computational cost of each iteration, massive parallel computing platforms such as GPU, multi-core CPUs can be used. To efficiently leverage the potential of parallelization, the algorithms are required to update the image simultaneously. Conventional simultaneous update algorithm tend to have slow convergence. In contrast, the methods described herein use an advanced algorithm that yields fast convergence speed of IR.

To better understand the methods described herein, several alternative approaches to speeding up IR are now described. One of these approaches is based on accelerated Nesterov descent. However, Nesterov acceleration and CG is still not sufficiently fast to satisfy clinical requirements. Using ordered subsets (OS) in addition to the Nesterov acceleration and CG can improve the overall convergence speed significantly.

Conjugate gradients (CG) is another optimization algorithm. The methods described herein use OS accelerated CG-based IR, which has faster convergence than the OS-Nesterov-based IR. In OS-Nesterov-based IR, OS acceleration sometimes results in inexact gradients and may lead to divergence. In the methods described herein one or more of several restarting rules described below overcome this shortcoming.

Figure 1:
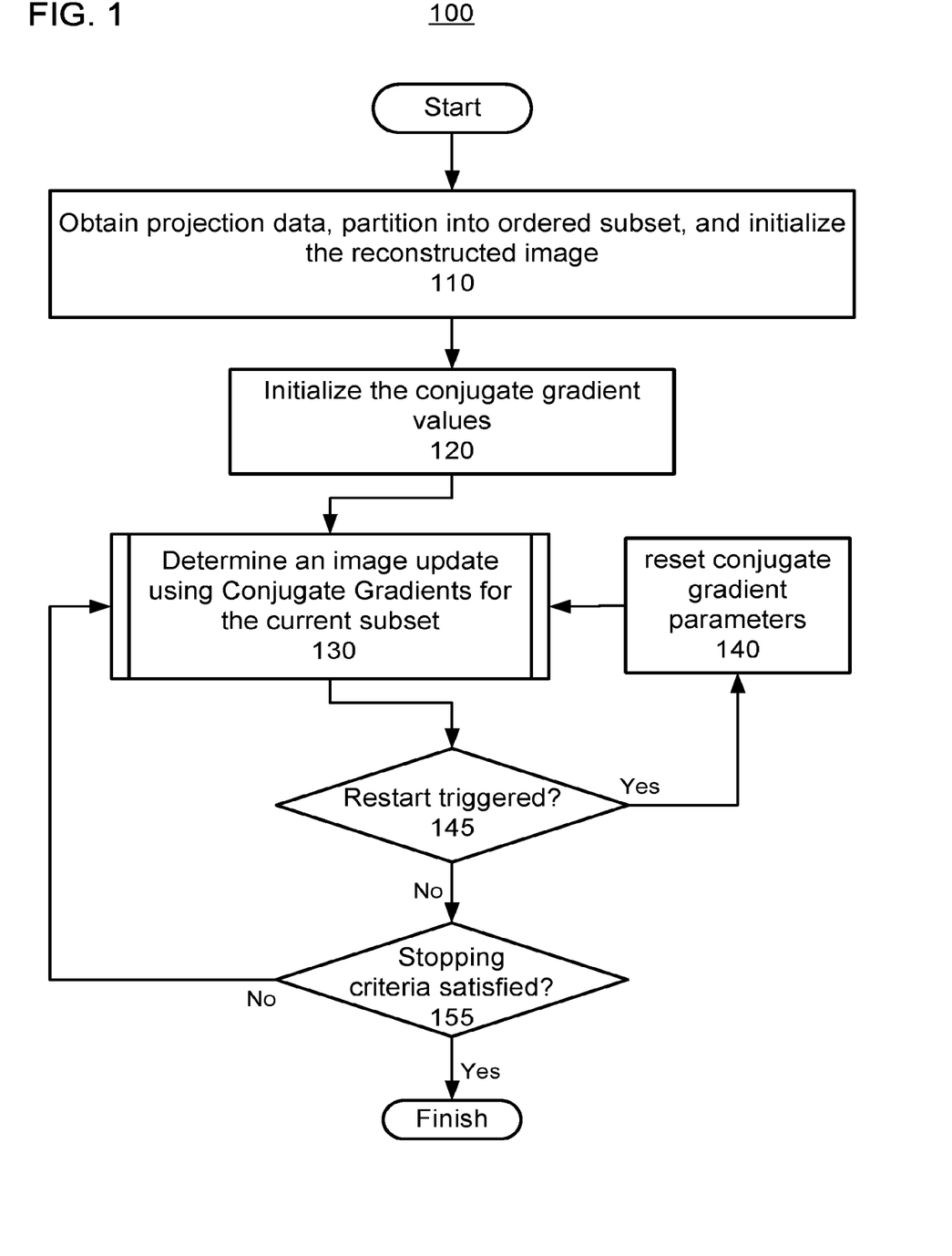
FIG. 1 shows a flow diagram of a method for accelerating iterative reconstruction (IR) in computed tomography (CT), according to one implementation.

Referring now to the drawings, wherein like reference numerals designate identical or corresponding parts throughout the several views, FIG. 1 shows a non-limiting example of a flow diagram of an OS accelerated CG-based IR method (i.e., method 100). In general, method 100 iteratively reconstructs a CT image by performing unconstrained (or constrained) optimization of an objective function to effectively solve the matrix equation $$Ax=y,$$

wherein y is the projection data, x is the image being reconstructed, and A represents a forward projection operator.

In certain implementations, IR methods can be formulated to generate an image by minimizing an objective function for regularized weighted least square reconstruction, e.g., by solving the expression $$\hat{x} = \underset{x \geq 0}{\operatorname{argmin}} \Phi(x), \Phi(x) = L(x) + \beta U(x)$$

with $\beta U(x)$ being the regularization term and the data fidelity term being $$L(x) = \tfrac{1}{2}(y - Ax)^T W(y - Ax),$$

wherein the matrix W can be a diagonal matrix in which the values along the diagonal are the statistical weights. In the regularization term, the regularization function $U(\cdot)$ is multiplied by a regularization parameter $\beta$, which adjusts the strength of the regularization term. Finally, the symbol T denotes matrix or vector transpose.

When the OS technique is applied, the projection data is partitioned into N (N>0) non-overlapped (or in some implementations overlapping) subsets. For each subset, a partial objective function can be defined as $$\Phi_n(x) = L_n(x) + \beta U(x) \text{ with}$$

$$L_n(x) = \frac{N}{2}(y_n - A_n x)^T W_n (y_n - A_n x),$$

wherein $\Omega_n$ is the nth subset of the entire set of projection data $\Omega$. Often $\Phi_n(x) \approx \Phi(x)$, $\forall n$. When the subsets are non-overlapping and equally sized, the total objective function $\Phi(x)$ is the average of the constituent subset objective functions $\Phi_n(x)$, i.e., $$\Phi(x) = \frac{1}{N} \sum_n \Phi_n(x).$$

OS-based iteration is performed by first minimizing $\Phi_n(x)$ to get $x^{k+1}$ ($x^{k+1}$ might not be necessarily the exact minimizer). Then $x^{k+1}$ can be used as the initial image for solving the next function $\Phi_{n+1}$ defined on subset n+1. This procedure is repeated and the minimizer of the last subset can be fed into the first subset to start a new round of iteration over each of the subsets.

The core of method 100 is to use an OS accelerated CG method to solve the optimization problem (i.e., minimize the objective function). However, the algorithm accelerated using OS can cease converging as it approaches an error limit imposed by the limit cycle effect. Accordingly, method 100 can be augmented with a restarting mechanism to achieve global convergence. Further, method 100 can be augmented by certain implementations variously including the use of preconditioners and respective modifications for calculating the conjugate directions. Additionally, in certain implementations, each subset keeps its own conjugate direction and preconditioner, rather than the results (e.g., the conjugate direction and preconditioner) of the $n^{th}$ subset being used to calculate the conjugate direction and preconditioner of the $n+1^{th}$ subset.

In step 110 of method 100, the projection data is obtained (e.g., received from an imaging system) and partitioned into ordered subset. Further, the reconstructed image is initialized (e.g., using a filtered back-projection method).

In step 120 of method 100, the conjugate gradient values are initialized.

Figure 2:
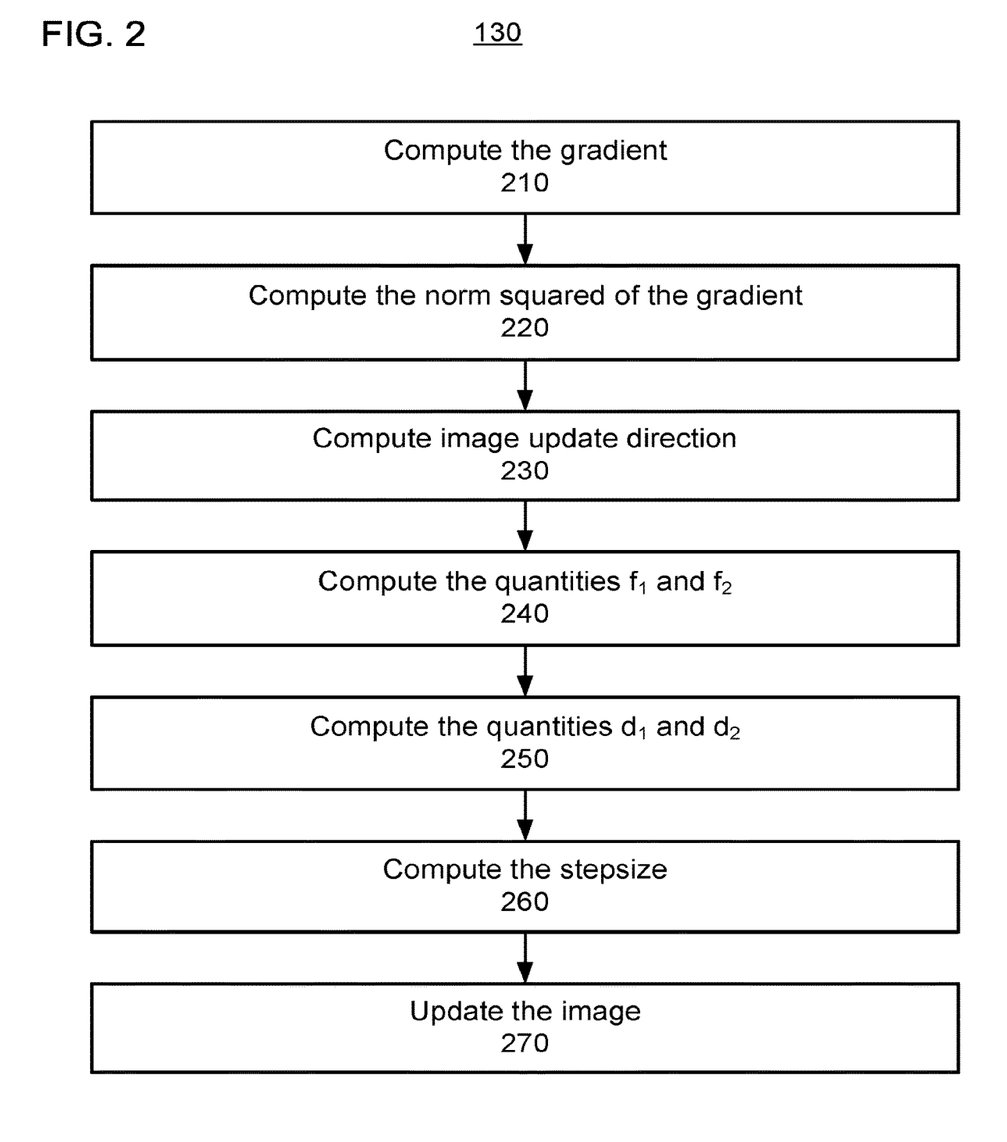
FIG. 2 shows a flow diagram of a process for updating a reconstructed image using a conjugate gradient of a current subset of the ordered subsets, according to one implementation.

In process 130 of method 100, the image is updated using Conjugate Gradients for the current subset. FIG. 2 provides a non-limiting example of a flow diagram of process 130.

In step 145 of method 100, an inquiry is preformed regarding whether or not various restart criteria have been satisfied. If the restart criteria have been satisfied, then method 100 proceeds to step 140. Otherwise, method 100 proceeds to step 155.

In step 140 of method 100, various conjugate-gradient parameters are reset.

In step 155 of method 100, an inquiry is preformed regarding whether or not various stopping criteria have been satisfied. If the stopping criteria have been satisfied, then method 100 is finished, and method 100 provides the finalized reconstructed image to a user (e.g., by displaying the image on a computer monitor/display). Otherwise, method 100 proceeds to step 130, and the iterative loop continues until the stopping criteria are satisfied.

According to the non-limiting example discussed above, an IR algorithm is described to solve the optimization problem $$\hat{x} = \mathrm{argmin}_{x \geq 0} \Phi(x), \Phi(x) = L(x) + \beta U(x).$$

For purposes of illustration, process 130 is described using the non-limiting example of the regularization function $U(\cdot)$ being the total variation functional:

$$U(x) = \sum_{\vec{i}} u_{\vec{i}}, \text{ and}$$

$$u_{\vec{i}} = \sqrt{\sum_{\vec{j}:|\vec{i}-\vec{j}|=1} (x_{\vec{j}} - x_{\vec{i}}) + \epsilon}.$$

Here $\vec{i}$ and $\vec{j}$ are three-dimensional indices, and $\epsilon > 0$ is a small positive number that ensures that the TV functional is differentiable. The condition $|\vec{i}-\vec{j}|=1=1$ means that the summation inside the square root in the above expression is over the following six values $\vec{j} \in \{\vec{i} \pm (1,0,0), \vec{i} \pm (0,1,0), \sim 0), \vec{i} \pm (0,0,1)\}$. Let $x_0$ be an initial volume (can be zero or the result of FBP reconstruction), and let $P_n$ denote a preconditioner. In certain implementations, the preconditioner can change from sub-iteration to sub-iteration.

To speed up convergence, ordered subsets (OS) are used to approximate calculations of the gradient of the fidelity term. Let n denote the (sub)-iteration number, $\Omega_n$ denotes the subset of views used in the $n^{th}$ iteration, and $c_n$ denotes the number of views in $\Omega_n$ divided by the total number of views.

In step 210 of process 130, the gradient $r_n$ of the cost functional (i.e., the objective function) is computed, as given by $$r_n \approx \frac{1}{c_n} A_n^T (y_n - A_n x_n) + \beta \nabla U(x_n)$$

wherein $A_n$ is the forward projection matrix corresponding to the views of the subset $\Omega_n$, $y_n$ is the projection data corresponding to the views in $\Omega_n$, and $\nabla U(x_n)$ is the gradient of the regularization term evaluated using the current reconstructed image $x_n$.

In step 220 of process 130, the norm squared of the gradient $\|r_n\|^2$ is computed.

In step 230 of process 130, Compute image update direction $p_n$ is computed as $$p_n = -P_n r_n \text{ if } n = 0, \text{ and}$$

$$p_n = -P_n r_n + \gamma_n r_{n-1} \text{ if } n \neq 0, \text{ wherein}$$

$$\gamma_n = \frac{\langle P_n r_n, r_n \rangle}{\langle P_n r_{n-1}, r_{n-1} \rangle}$$

In step 240 of process 130, the data-fidelity quantities $f_1$ and $f_2$ are computed according to $$A_n p_n$$

$$f_1 = \frac{1}{c_n} \langle A_n p_n, y - A_n x_n \rangle_w$$

$$f_2 = \frac{1}{c_n} \|A_n p_n\|_w^2$$

Note that $f_1$ and $f_2$ are the OS versions of the first and second order derivatives of the data fidelity term in the direction of $p_n$. Here, as before, $A_n$ is the forward projection matrix corresponding to the views in $\Omega_n$, and the dot (inner) products $(\cdot, \cdot)$ are computed also using the views in $\Omega_n$.

In step 250 of process 130, the regularization quantities $d_1$ and $d_2$ are computed according to $$U(x_n + tp_n) \leq U(x_n) + d_1 t + d_2 \frac{t^2}{2}, \text{ wherein}$$

$$d_1 = \frac{d}{dt} \nabla U(x_n + tp_n)|_{t=0}.$$

In step 260 of process 130, the step size is computed according to $$\alpha_n = \frac{f_1 + \beta d_1}{f_2 + \beta d_2};$$

In step 270 of process 130, the image is updated according to $$x_{n+1} = x_n + \alpha_n p_n.$$

Regarding step 250, it can be noted that the computation of $d_2$ can be performed based on the fact that in the case of the TV functional, $U(x_n + tp_n)$ can be expressed as a sum of terms of the kind $\sqrt{at^2 + 2bt + c}$, where $a, c > 0$ and $b^2 - ac < 0$. Thus, given that it is known how to estimate one such term, it is also known how to estimate the TV functional. For example, the following inequality $$\sqrt{at^2+2bt+c} \le \sqrt{c} + \frac{b}{\sqrt{c}}t + \frac{a}{2\sqrt{c}}t^2$$

can be applied to all the terms that make up the TV functional $U(x_n+tp_n)$ and combining all the coefficients in front of $t^2/2$ yields an expression for $d_2$. In this case, the resulting quadratic function is a parabolic surrogate, but not a separable parabolic surrogate.

As discussed above in relation to step 145, method 100 allows for one or more restart rules. For example, one of these restart rules (e.g., also referred to as restart criteria) can be as follows: if the value of the cost functional increases after one full iteration (or after a predetermined number of sub-iterations), some of the CG parameters are reset to initial values. For example, the current image $x_n$ is used and $\gamma_n=0$ is reset to zero. That is, Steps 210, 220, and 240-270 stay the same, and in Step 230, the computations are performed according to $$p_n = -Pr_n.$$

Further, in certain implementations, the effect of satisfying the restart criteria may extend beyond just resetting the momentum term to also resetting other features of the algorithm as well. For instance, if a restart is triggered, the number of subsets might be changed.

As discussed above, a preconditioner $P_n$ can be applied in the calculations of the update direction $p_n$. One possible choice of the preconditioner P is the inverse of the diagonal matrix, which is obtained as a separable parabolic surrogate for the cost functional. Let $\vec{i}$ be a three-dimensional index parametrizing views, and $\vec{i}$ and $\vec{j}$ be three-dimensional indices parametrizing voxels. The formula for the diagonal entry of $P^{-1}$ that corresponds to the $i^{th}$ voxel is given by $$\sum_{\vec{j},\vec{l}} A_{\vec{l}\vec{i}} w_{\vec{l}} A_{\vec{l}\vec{j}} + 2\beta \sum_{\vec{j}:|\vec{i}-\vec{j}|=1}\left(\frac{1}{u_{\vec{i}}}+\frac{1}{u_{\vec{j}}}\right)\epsilon,$$

wherein $u_{\vec{i}}$ can be defined by $$U(x) = \sum_{\vec{i}} u_{\vec{i}}, \text{ and}$$

$$u_{\vec{i}} = \sqrt{\sum_{\vec{j}:|\vec{i}-\vec{j}|=1}(x_{\vec{j}}-x_{\vec{i}})+\epsilon}.$$

Further, there are many different ways for computing the parameter $\gamma_n$ in step 230. The method shown above for computing $\gamma_n$ is known as the Fletcher-Reeves formula. Two other examples for computing $\gamma_n$ are the Polak-Ribiere-Polyak and Hestenes-Stiefel formulas, which are respectively given by $$\gamma_n^{PRP} = \frac{\langle P_n r_n, r_n - r_{n-1}\rangle}{\langle P_n r_{n-1}, r_{n-1}\rangle}, \text{ and}$$

$$\gamma_n^{HS} = \frac{\langle P_n r_n, r_n - r_{n-1}\rangle}{\langle P_{n-1} r_n, r_n - r_{n-1}\rangle}.$$

In certain implementations, the Fletcher-Reeves formula is preferable when gradients are computed approximately (e.g., when using OS) because it does not use the difference of gradients at two sub-iterations. If different subsets are used for computing $r_n$ and $r_{n-1}$, then the error in computing their difference may be large. If, in later iterations, the number of subsets is small, then the formulas for computing $\gamma_n$ based on $r_n - r_{n-1}$ might be effectively used as well.

As discussed above, in various implementations, method 100 can be used with restart one or more restart criteria. Non-limiting examples of restart criteria include the rule that "if the value of the overall cost functional increases after one full iteration, then reset respective CG parameters. For example, the CG parameters can be reset by setting k=0 and use the current image as $x_{k=0}$ to start at the first of the ordered subset $\Omega_0$. Another restart criteria that has been demonstrated as being effective is to restart when the value of the subset cost functional increases from one sub-iteration to the next. As discussed previously, the effect of restarting is not limited to resetting the CG parameters. For example, when the restart criteria are satisfied, step 140 of method 100 can change the number of subsets, in addition to (or rather than) changing/resetting the CG parameters.

As discussed above, to further improve the convergence speed of the CG algorithm, method 100, a preconditioner can be used to calculate the conjugate-gradient term $\gamma_n$, e.g., $$\gamma_n = \frac{\langle P_n r_n, r_n\rangle}{\langle P_n r_{n-1}, r_{n-1}\rangle}.$$

In certain implementations, a diagonal preconditioner can be used, e.g., when the diagonal entry of $P^{-1}$ corresponds to the $i^{th}$ voxel is given by $$\sum_{\vec{j},\vec{l}} A_{\vec{l}\vec{i}} w_{\vec{l}} A_{\vec{l}\vec{j}} + 2\beta \sum_{\vec{j}:|\vec{i}-\vec{j}|=1}\left(\frac{1}{u_{\vec{i}}}+\frac{1}{u_{\vec{j}}}\right).$$

In other implementations, a Fourier preconditioner can be used. Alternatively, the preconditioner can be updated every iteration e.g. using the above equation for the diagonal entries of $P^{-1}$, in which $u_{\vec{i}}$ and $u_{\vec{j}}$ can be updated every iteration using the equation $$\sum_{\vec{j},\vec{l}} A_{\vec{l}\vec{i}} w_{\vec{l}} A_{\vec{l}\vec{j}} + 2\beta \sum_{\vec{j}:|\vec{i}-\vec{j}|=1}\left(\frac{1}{u_{\vec{i}}}+\frac{1}{u_{\vec{j}}}\right).$$

In gradient based algorithms, the majority of the computational burden can be due to computing the gradient of the cost functional, which consists of the data fidelity and regularization terms. Further, in certain implementations, the dominant computational burden of computing the gradient can be attributed to calculating the gradient of the data fidelity term. To reduce the overall computational burden, method 100 can be perform, we compute the gradient of the data fidelity term in an approximate fashion using the OS approach, whereas the gradient of the regularization term is computed exactly. Various implementations can be used to compute the gradient of the data fidelity term in an approximate fashion. For example, the iterations can be divided into early iterations and late iterations. In early iterations, the regularization term can be approximated using a surrogate function. Then in latter iterations, an exact (or more exact and more computationally intensive approximation) can be used for the gradient of the data fidelity term. Further, this approximation will be updated every few sub-iterations.

In certain implementations, the overall computational burden can be reduced by omitting the regularization term during the early iterations.

In certain implementations, the overall computational burden can be reduced by reducing how often the gradient of the data fidelity term is calculated.

In certain implementations, the number of views in a subset used for computing the gradient of the data fidelity term can change from iteration to iteration, or can change when the restart is triggered.

In ordered subset, each subset has its own subset cost function. In general, these subset cost functions are approximately equal to each other, as discussed above. Therefore, in the examples discussed above, the conjugate direction p, for a current subset is calculated using the gradients from the current subset and from other subsets (e.g., $p_n = -P_n r_n + \gamma_n r_{n-1}$). However, in some cases (e.g., when the number of subset is large or when data quality problems arise, e.g., due to truncation, metal, motion, etc.) the subset cost functions might not be approximately equal to each other. In these cases, method 100 can be modified such that the conjugate direction $p_n$ for each subset is calculated independently of the other subsets. Similarly, when a preconditioner is applied, the preconditioner $P_n$ for each subset can be computed independently of the other subsets.

In view of the above various implementations of method 100 several advantages can be realized. First, method 100 does not need to use separable surrogates. Second, method 100 can include a restart rule to improve convergence. The restart rule may change the CG term and/or change the number of subsets and/or other parameters. Second, method 100 uses ordered subsets to speed up convergence. Third, method 100 can use a preconditioner to speed up convergence. Fourth, method 100 can allow for dropping the regularizer from the cost functional in early iterations.

Figure 3:
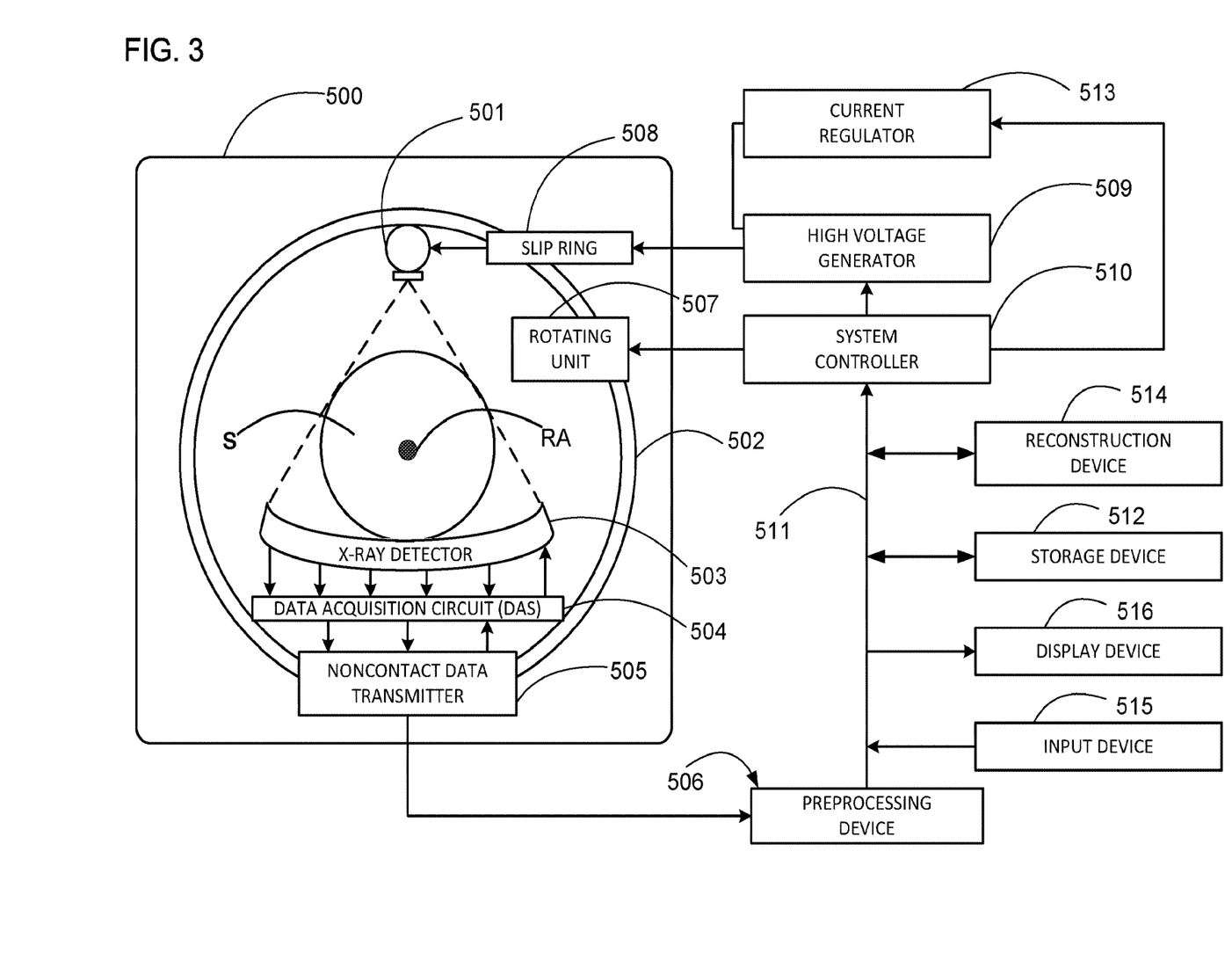
FIG. 3 shows a schematic of an implementation of a CT scanner, according to one implementation.

FIG. 3 illustrates an implementation of the radiography gantry included in a CT apparatus or scanner. As shown in FIG. 3, a radiography gantry 500 is illustrated from a side view and further includes an X-ray tube 501, an annular frame 502, and a multi-row or two-dimensional-array-type X-ray detector 503. The X-ray tube 501 and X-ray detector 503 are diametrically mounted across an object OBJ on the annular frame 502, which is rotatably supported around a rotation axis RA. A rotating unit 507 rotates the annular frame 502 at a high speed, such as 0.4 sec/rotation, while the object OBJ is being moved along the axis RA into or out of the illustrated page.

The first embodiment of an X-ray computed tomography (CT) apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate type, which is currently the mainstream, will be exemplified.

The multi-slice X-ray CT apparatus further includes a high voltage generator 509 that generates a tube voltage applied to the X-ray tube 501 through a slip ring 508 so that the X-ray tube 501 generates X-rays. The X-rays are emitted towards the object OBJ, whose cross sectional area is represented by a circle. For example, the X-ray tube 501 having an average X-ray energy during a first scan that is less than an average X-ray energy during a second scan. Thus, two or more scans can be obtained corresponding to different X-ray energies. The X-ray detector 503 is located at an opposite side from the X-ray tube 501 across the object OBJ for detecting the emitted X-rays that have transmitted through the object OBJ. The X-ray detector 503 further includes individual detector elements or units.

The CT apparatus further includes other devices for processing the detected signals from X-ray detector 503. A data acquisition circuit or a Data Acquisition System (DAS) 504 converts a signal output from the X-ray detector 503 for each channel into a voltage signal, amplifies the signal, and further converts the signal into a digital signal. The X-ray detector 503 and the DAS 504 are configured to handle a predetermined total number of projections per rotation (TPPR).

The above-described data is sent to a preprocessing device 506, which is housed in a console outside the radiography gantry 500 through a non-contact data transmitter 505. The preprocessing device 506 performs certain corrections, such as sensitivity correction on the raw data. A memory 512 stores the resultant data, which is also called projection data at a stage immediately before reconstruction processing. The memory 512 is connected to a system controller 510 through a data/control bus 511, together with a reconstruction device 514, input device 515, and display 516. The system controller 510 controls a current regulator 513 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 501 and the X-ray detector 503 are diametrically mounted on the annular frame 502 and are rotated around the object OBJ as the annular frame 502 is rotated about the rotation axis RA. In the fourth-generation geometry system, the detectors are fixedly placed around the patient and an X-ray tube rotates around the patient. In an alternative embodiment, the radiography gantry 500 has multiple detectors arranged on the annular frame 502, which is supported by a C-arm and a stand.

The memory 512 can store the measurement value representative of the irradiance of the X-rays at the X-ray detector unit 503. Further, the memory 512 can store a dedicated program for executing method 100 for CT image reconstruction.

The reconstruction device 514 can execute method 100. Further, reconstruction device 514 can execute pre-reconstruction processing image processing such as volume rendering processing and image difference processing as needed.

The pre-reconstruction processing of the projection data performed by the preprocessing device 506 can include correcting for detector calibrations, detector nonlinearities, and polar effects, for example.

Post-reconstruction processing performed by the reconstruction device 514 can include filtering and smoothing the image, volume rendering processing, and image difference processing as needed. The image reconstruction process can implement method 100. The reconstruction device 514 can use the memory to store, e.g., projection data, reconstructed images, calibration data and parameters, and computer programs.

The reconstruction device 514 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 512 can be non-volatile, such as ROM, EPROM, EEPROM or FLASH memory. The memory 512 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 514 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 516. The display 516 can be an LCD display, CRT display, plasma display, OLED, LED or any other display known in the art.

The memory 512 can be a hard disk drive, CD-ROM drive, DVD drive, FLASH drive, RAM, ROM or any other electronic storage known in the art.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
   circuitry configured to
   obtain projection data representing an intensity of X-ray radiation detected at a plurality of detector elements, the X-ray radiation being detected after having been transmitted through an image volume, and the projection data being partitioned into a plurality of subsets,
   initialize an image, the image representing X-ray attenuation within the image volume that is reconstructed from the projection data,
   iteratively update the image using a conjugate gradient of an objective function applied to respective subsets of the plurality of subsets, the objective function including a data fidelity term and a regularization term,
   check whether a restart criterion is satisfied, the restart criterion being based on the updated image,
   reset conjugate gradient parameters for iteratively updating the image when the restart criterion is satisfied, and
   control a display to display the updated image.

2. The apparatus according to claim 1, wherein the circuitry is further configured to iteratively update the image using the conjugate gradient by
   calculating a data-fidelity gradient with respect to the data fidelity term of the objective function of a given subset, and calculating a regularization gradient with respective to the regularization term of the objective function of the given subset to generate an update direction,
   calculating a step size based on (i) first terms derived from the data fidelity term of the objective function of the given subset and (ii) second terms derived from the regularization term of the objective function of the given subset, and
   calculating the updated image of a next iteration of the iteratively updating the image by summing the updated image of a current iteration with a product of the step size and the update direction.

3. The apparatus according to claim 2, wherein the circuitry is further configured to iteratively update the image using a conjugate gradient by calculating the update direction using a diagonal preconditioner and a conjugate-gradient term $\gamma_n$.

4. The apparatus according to claim 3, wherein the conjugate-gradient term $\gamma_n$ is calculated using one of a Fletcher-Reeves formula, a Polak-Ribiere-Polyak formula, and Hestenes-Stiefel formula.

5. The apparatus according to claim 2, wherein calculating the data-fidelity gradient is accelerated by at least one of:
   using as the data-fidelity gradient an approximation calculated by back projecting a difference between projection data of the given subset and a forward projection of the image,
   using as the data-fidelity gradient an approximation calculated using a surrogate function,
   omitting, from the calculation of the objective function gradient, the regularization gradient for a predetermined number of iterations, and then using data-fidelity gradient in the calculation of the objective function gradient during subsequent iterations, and
   approximating the data-fidelity gradient using a reduced number of views for predetermined iterations, and then during other iterations using all views of the given subset to calculate the data-fidelity gradient.

6. The apparatus according to claim 2, wherein the circuitry is further configured to iteratively update the image using a conjugate gradient using a diagonal preconditioner, wherein
   the diagonal preconditioner is at least one of (a) an inverse of a diagonal matrix that is obtained as a parabolic surrogate for the objective function, and
   (b) a Fourier preconditioner.

7. The apparatus according to claim 1, wherein the circuitry is further configured to, after completing a complete iteration by iteratively updating the image for all respective subsets of the plurality of subsets, repeating another complete iteration by again iteratively updating the image for all the respective subsets, until a convergence criterion is satisfied.

8. The apparatus according to claim 3, wherein the circuitry configured to check whether the restart criterion is satisfied comprises circuitry configured to check whether plural restart criteria are satisfied, wherein the plural restart criteria include at least two of:
- a condition of a value of the objective function at completion of a previous complete iteration of updating the image for all the respective subsets is less than a value of the objective function at completion of a current complete iteration of updating the image for all the respective subsets,
- a condition of a value of the objective function at completion of a previous iteration of updating the image for a given subset is less than a value of the objective function at completion of a predefined number of iterations of updating the image for the predefined number of subsets, and
- a condition that a convergence rate of one or more iterations of updating the image slows below a predefined threshold.

9. The apparatus according to claim 1, wherein the circuitry is further configured to reset the conjugate gradient parameters for iteratively updating the image by at least one of:
- setting a conjugate-gradient term $\gamma_n$ to zero, and
- partitioning the projection data into another plurality of subsets, which replaces the plurality of subsets, a number of subsets in the another plurality of subsets being different from a number of subsets in the plurality of subsets.

10. The apparatus according to claim 1, wherein the restart criterion comprises a condition of a value of the objective function at completion of a previous complete iteration of updating the image for all the respective subsets is less than a value of the objective function at completion of a current complete iteration of updating the image for all the respective subsets.

11. The apparatus according to claim 1, wherein the restart criterion comprises a condition of a value of the objective function at completion of a previous iteration of updating the image for a given subset is less than a value of the objective function at completion of a predefined number of iterations of updating the image for the predefined number of subsets.

12. The apparatus according to claim 1, wherein the restart criterion comprises a condition that a convergence rate of one or more iterations of updating the image slows below a predefined threshold.

13. An apparatus, comprising:
an X-ray source to radiate X-rays;
a plurality of detector elements, each configured to
  detect the X-ray radiation emanating from the X-ray source, the detected X-ray radiation having been transmitted through an image volume, and
  generate projection data representing an intensity of the X-ray radiation detected at the plurality of detector elements, the projection data being partitioned into a plurality of subsets; and
processing circuitry configured to
  partition the projection data into a plurality of subsets,
  initialize an image, the image representing X-ray attenuation within the image volume that is reconstructed from the projection data,
  iteratively update the image using a conjugate gradient of an objective function applied to respective subsets of the plurality of subsets, the objective function including a data fidelity term and a regularization term,
  check whether a restart criterion is satisfied, the restart criterion being based on the updated image,
  reset conjugate gradient parameters for iteratively updating the image when the restart criterion are satisfied, and
  control a display to display the updated image.

14. A method, comprising:
obtaining projection data representing an intensity of X-ray radiation detected at a plurality of detector elements after the X-ray radiation has been transmitted through an image volume, the projection data being partitioned into a plurality of subsets,
initializing an image, the image representing X-ray attenuation within the image volume that is reconstructed from the projection data,
iteratively updating the image using a conjugate gradient of an objective function applied to respective subsets of the plurality of subsets, the objective function including a data fidelity term and a regularization term,
checking whether a restart criterion is satisfied, the restart criterion being based on the updated image,
resetting conjugate gradient parameters for iteratively updating the image when the restart criterion is satisfied, and
controlling a display to display the updated image.

15. The method according to claim 14, wherein the iteratively updating the image using a conjugate gradient is performed by
calculating a data-fidelity gradient with respect to the data fidelity term of the objective function of a given subset, and calculating a regularization gradient with respect to the regularization term of the objective function of the given subset to generate an update direction,
calculating a step size based on first terms derived from the data fidelity term of the objective function of the given subset, and based on second terms derived from the regularization term of the objective function of the given subset, and
calculating the updated image of a next iteration of the iteratively updating the image by summing updated image of a current iteration with a product of the step size and the update direction.

16. The method according to claim 12, wherein the iteratively updating the image using a conjugate gradient includes calculating the update direction using a diagonal preconditioner and a conjugate-gradient term $\gamma_n$.

17. The method according to claim 16, wherein the conjugate-gradient term $\gamma_n$ is calculated using one of a Fletcher-Reeves formula, a Polak-Ribiere-Polyak formula, and Hestenes-Stiefel formula.

18. The method according to claim 12, wherein the calculating the data-fidelity gradient is accelerated by at least one of:
using as the data-fidelity gradient an approximation calculated by back projecting a difference between projection data of the given subset and a forward projection of the image,
using as the data-fidelity gradient an approximation calculated using a surrogate function,
omitting the data-fidelity gradient for a predetermined number of iterations before using data-fidelity gradient in subsequent iterations, and
approximating the data-fidelity gradient by using a reduced number of views for a predetermined number of iterations, and then in subsequent iterations using all views of the given subset used for iteratively updating the image.

19. The method according to claim 14, further comprising, after iteratively updating the image for all respective subsets of the plurality of subsets, repeating another complete iteration of updating the image for all the respective subsets, until a convergence criterion is satisfied.

20. The method according to claim 19, wherein checking whether the restart criterion is satisfied comprises checking whether plural restart criteria are satisfied and the plural the restart criteria include at least two of:
- a condition of a value of the objective function at completion of a previous complete iteration of updating the image for all the respective subsets is less than a value of the objective function at completion of a current complete iteration of updating the image for all the respective subsets,
- a condition of a value of the objective function at completion of a previous iteration of updating the image for a given subset is less than a value of the objective function at completion of a predefined number of iterations of updating the image for the predefined number of subsets, and
- a condition that a convergence rate of one or more iterations of updating the image slows below a predefined threshold.

21. The method according to claim 14, wherein the resetting the conjugate gradient parameters for iteratively updating the image includes at least one of:
- setting a conjugate-gradient term $\gamma_n$ to zero, and
- partitioning the projection data into another plurality of subsets, which replaces the plurality of subsets, a number of subsets in the another plurality of subsets being different from a number of subsets in the plurality of subsets.

22. The method according to claim 14, wherein the iteratively updating the image using a conjugate gradient is performed using a diagonal preconditioner, wherein
the diagonal preconditioner is at least one of (a) an inverse of a diagonal matrix that is obtained as a separable parabolic surrogate for the objective function, and (b) a Fourier preconditioner.

23. A non-transitory computer readable storage medium including executable instruction, wherein the instructions, when executed by circuitry, cause the circuitry to perform the method according to claim 14.

24. The method according to claim 14, wherein the restart criterion comprises a condition of a value of the objective function at completion of a previous complete iteration of updating the image for all the respective subsets is less than a value of the objective function at completion of a current complete iteration of updating the image for all the respective subsets.

25. The method according to claim 14, wherein the restart criterion comprises a condition of a value of the objective function at completion of a previous iteration of updating the image for a given subset is less than a value of the objective function at completion of a predefined number of iterations of updating the image for the predefined munber of subsets.

26. The method according to claim 14, wherein the restart criterion comprises a condition that a convergence rate of one or more iterations of updating the image slows below a predefined threshold.

* * * * *